Figures 1, 2:
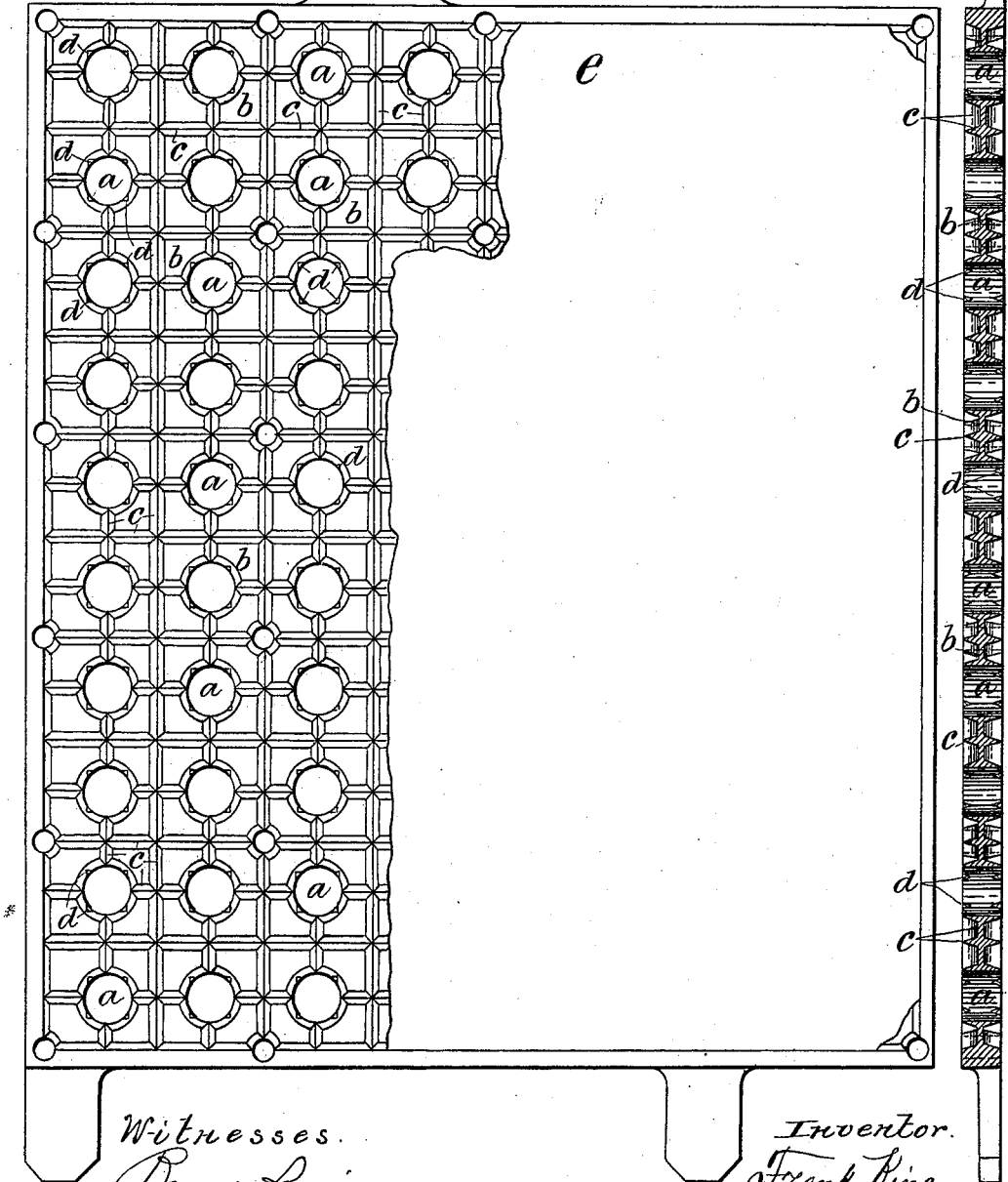

(No Model.)

F. KING.
SECONDARY BATTERY.

No. 568,447. Patented Sept. 29, 1896.

Witnesses.
Bew Lewis
W. R. Edelen.

Inventor.
Frank King
by Pollok & Mauro
his attorneys.

UNITED STATES PATENT OFFICE.

FRANK KING, OF LONDON, ENGLAND, ASSIGNOR TO JOHN IRVING COURTENAY, OF SAME PLACE.

SECONDARY BATTERY.

SPECIFICATION forming part of Letters Patent No. 568,447, dated September 29, 1896.

Application filed April 10, 1896. Serial No. 587,028. (No model.)

*To all whom it may concern:*

Be it known that I, FRANK KING, engineer, a subject of the Queen of Great Britain and Ireland, residing at 4 Great Winchester Street, in the city of London, England, have invented certain Improvements in or Connected with Secondary Batteries, of which the following is a specification.

My invention relates to secondary batteries, and has for its object to effect circulation of the electrolyte over the surfaces of the plates more readily than hitherto.

It is found that when the active material is inclosed in porous diaphragms or envelops of insulating or inert material rapid sulfating of the surfaces of the plate results consequent on the lowering of the specific gravity of the electrolyte immediately underneath such porous diaphragms or envelops and in contact with the active material. This sulfating diminishes the conductivity and capacity of the battery, and my invention is intended to facilitate the circulation of the electrolyte and so retard or prevent the abnormal fall in specific gravity of the acid electrolyte in immediate contact with the active material under the porous diaphragm or envelop.

In the accompanying drawings I have shown in Figures 1 and 2 a side view and transverse section of a plate-support or grid constructed according to my invention, the inclosing envelop being partially broken away in Fig. 1 and entirely omitted in Fig. 2.

I make a number of perforations, passages, or pipes $a$, extending through the grid or support and finished plate. The said perforations, passages, or pipes $a$ may have parallel sides or they may be conical, or their outer ends may incline upward or toward the top of the plate. In the finished plate these perforations, passages, or pipes $a$ are unoccupied by active material or material to be rendered or to become active. The said material may be applied to the grid or support in the ordinary way, and such of the said material as may lodge in the said perforations, passages, or pipes $a$ be subsequently removed.

The grid or support may in other respects be of any suitable description—such, for example, as is shown—viz., with a thin central sheet $b$ and portions raised, as at $c$, from one or both sides to constitute pockets or recesses for the active material or material to be rendered active.

When the porous diaphragm or diaphragms or envelop is or are put upon the plate and the electrode is introduced into the cell, there will be a certain amount of the electrolyte filling the aforesaid perforations, passages, or pipes $a$, and as the specific gravity of the electrolyte rises or falls during the charging or discharging of the battery the superior or inferior specific gravity of the electrolyte in the said perforations, passages, or pipes $a$ will cause it to circulate under or through the porous diaphragm or diaphragms or envelop, and thus a slow but perfect renewal of the electrolyte in contact with the active material will be insured. I may make notches, as at $d$, in the sides of the perforations $a$ to facilitate the action. Small perforations $a'$ are also made through the grid or support.

Having now particularly described and ascertained the nature of this invention and in what manner the same is to be performed, I declare that what I claim is—

A secondary-battery-element plate, consisting of a support or grid having perforations or passages therethrough—such as $a$—unoccupied by the active material, active material applied to the plate, and an exterior covering or envelop for the plate of an insulating or inert material, said covering or envelop being imperforated over the perforations or passages through the grid or support, substantially as described.

In testimony whereof I have signed my name to this specification in the presence of two subscribing witnesses.

FRANK KING.

Witnesses:
 MALCOLM LEGGETT,
 CHARLES HENRY DENNIS.